Figure 1:
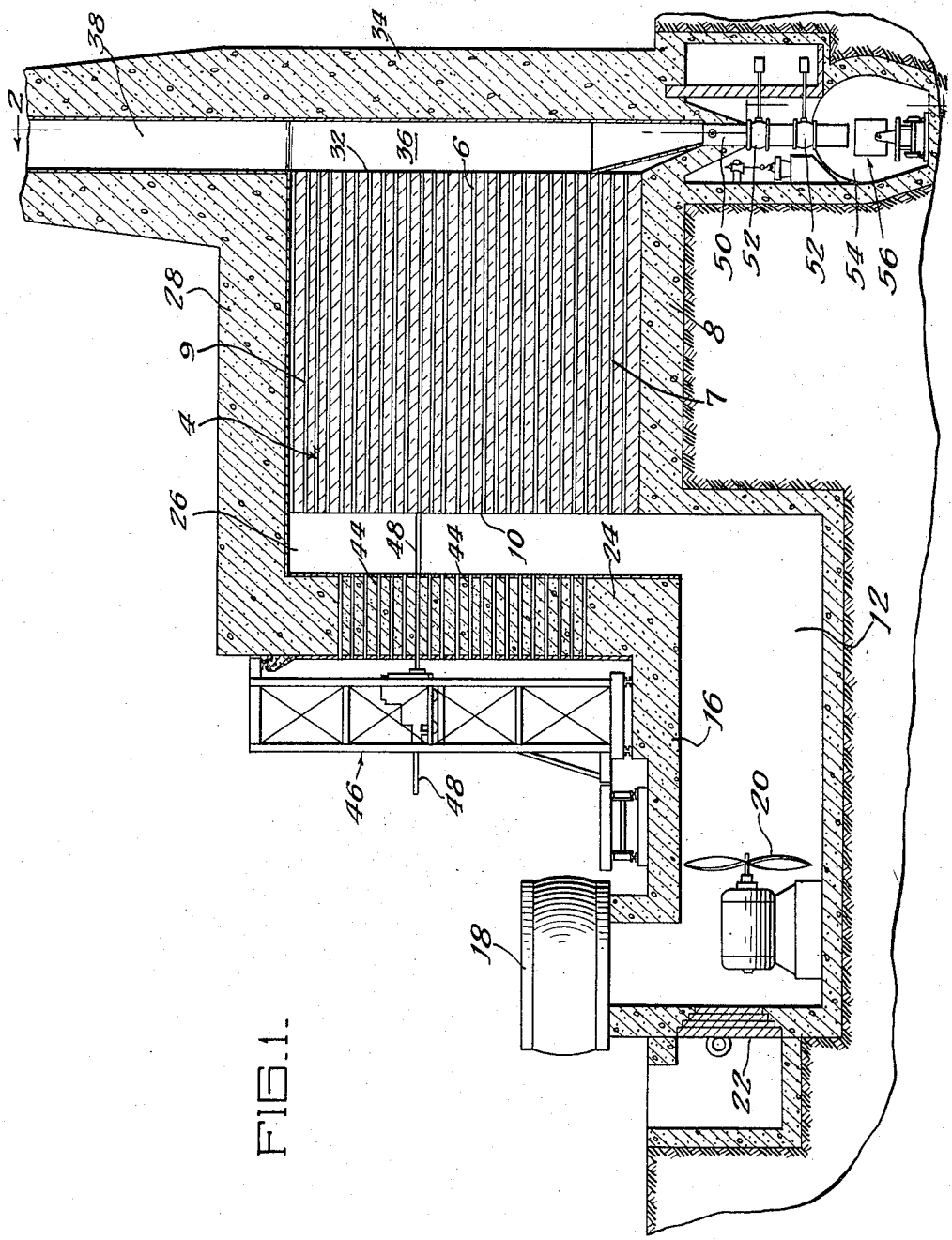

Aug. 30, 1960

G. T. SEABORG ET AL 2,951,023

METHOD OF PRODUCING $U^{233}$

Filed June 12, 1945

2 Sheets-Sheet 1

Witnesses:
Herbert E. Metcalf
Walter S. Schlegel, Jr.

Inventors:
Glenn T. Seaborg
Raymond W. Stoughton
By: Robert A. Lonergan
Attorney.

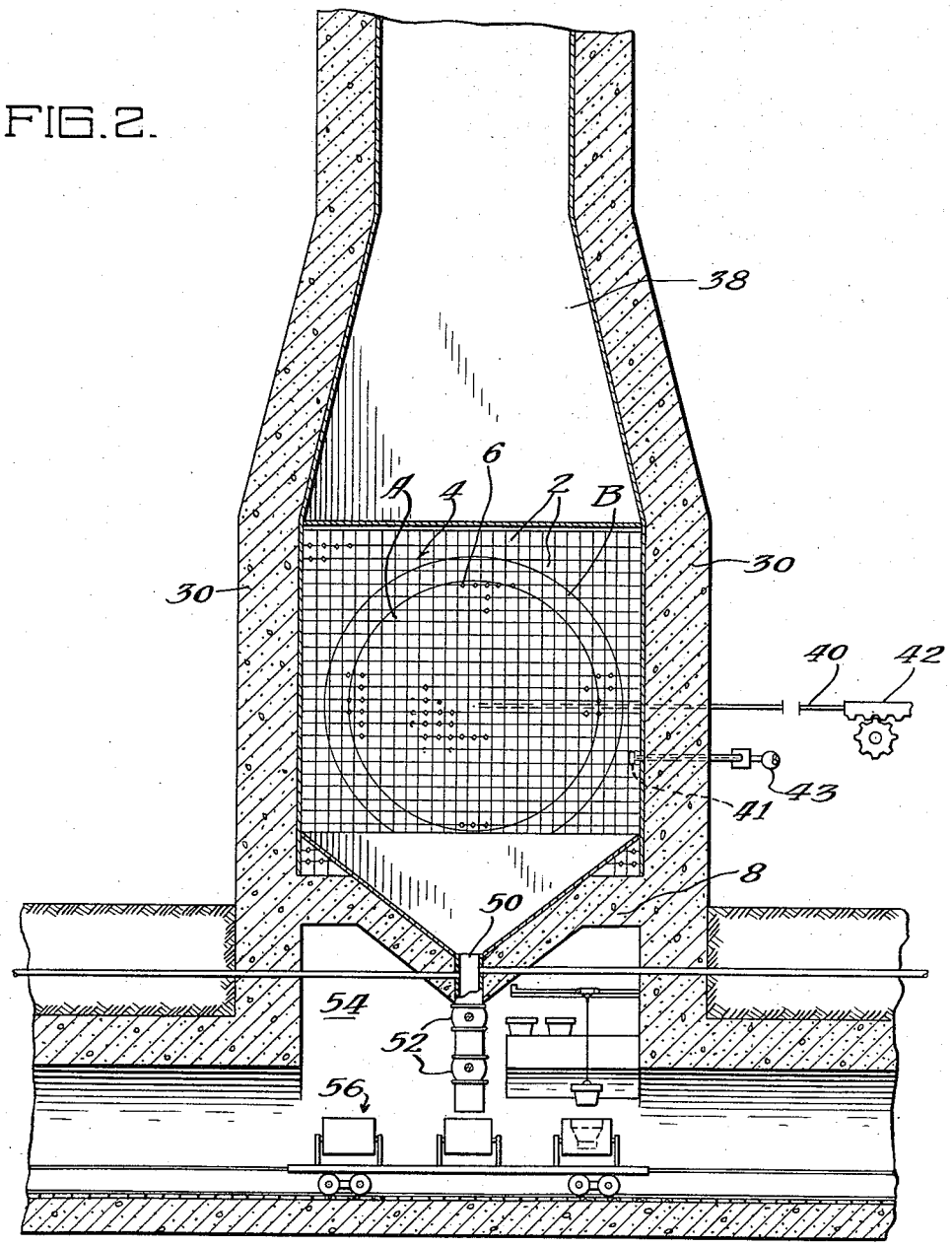

United States Patent Office 2,951,023
Patented Aug. 30, 1960

2,951,023

METHOD OF PRODUCING U²³³

Glenn T. Seaborg, Chicago, Ill., and Raymond W. Stoughton, Oak Ridge, Tenn., assignors to the United States of America as represented by the United States Atomic Energy Commission Filed June 12, 1945, Ser. No. 599,068

2 Claims. (Cl. 204—154.2)

This invention relates to the preparation of masses and compositions of the isotope of uranium having a mass number of 233, said isotope being designated as $92^{233}$ or $U^{233}$.

An object of the invention is to provide a novel method and means for producing $U^{233}$ and compositions containing $U^{233}$ in which the amounts of foreign products, particularly fission products of $U^{233}$, are maintained below a predetermined amount.

Still another object of the invention is to provide a novel method and means for bombarding thorium-containing material with neutrons, generated by a neutronic reactor, thereby converting $Th^{232}$ to $U^{233}$ as hereinafter more fully discussed.

Other objects and advantages of the invention will become apparent as the following detailed description progresses.

In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656, dated May 17, 1955.

In accordance with the present invention it has been found that $U^{233}$ may be prepared efficiently by bombarding with neutrons certain compounds of thorium isotope 232 and a moderating light element having an atomic number below 30 such as oxygen, fluorine, deuterium, carbon, beryllium, etc. A particularly effective result may be secured using thorium carbonate including hydrated thorium carbonate.

The reaction may be conducted in a neutronic reactor. In accordance with a further modification of the invention the thorium compositions may be used to absorb neutrons leaking from a neutronic reactor and thus a substantial saving of neutrons secured and a fissionable isotope produced in a single operation. In such a case the thorium compound may be pelleted to form agglomerates which may be disposed about a neutronic reactor and may be readily removed after bombardment.

In this specification the name of the element is used to designate the element generically either in its elemental or combined state unless otherwise indicated by the context.

In the drawings:

Fig. 1 is a longitudinal sectional view, taken on a vertical plane, of a structure embodying the invention; and Fig. 2 is a cross-sectional view taken on a vertical plane indicated by the line 2—2 of Fig. 1, portions of the structure being shown in elevation to clarify the illustration.

Describing the invention in detail, the system comprises a mass of graphite blocks 2, 2 closely piled or stacked into a cube 4. This structure is more fully described in the above identified Fermi-Szilard co-pending application. The cube 4 is provided with horizontal air channels 6, 7 and 9 and rests on a concrete foundation 8. Adjacent the inlet face 10 of the cube, the foundation 8 is continued downwardly to form the floor of an air duct 12 which also comprises side walls and a top wall 16. At some distance away from the cube 4 the inlet duct is turned upwardly and terminates in an air filter 18 relatively close to the surface of the ground. A fan or blower 20, here illustrated as electrically driven is installed on the floor of the inlet duct 12 just below the air filter, access to the fan being conveniently obtained through a duct door 22 behind the fan. The concrete top wall 16 of the inlet air duct is continued upwardly as an inlet shield 24 positioned parallel to but spaced from the inlet face 10 of the cube 4 to form an inlet chamber 26 communicating with the before-mentioned air channels 6.

Above the inlet chamber 26 and the cube 4, the concrete is continued horizontally to form a top shield 28, and side shields 30, 30 are built up from a foundation 8 to enclose the cube 4. The shields 28 and 30, 30 closely approach the top and side faces of the cube to minimize air flow around the outside thereof. A small amount of air circulation, however, may be desirable over the top and side faces to cool the same.

At the outlet face 32 of the cube 4, an outlet end shield 34 is provided, said shield being parallel to and spaced from the outlet face 32 to form an outlet chamber 36 communicating with a stack 38 projecting upwardly and formed as a continuation of the concrete top, side and outlet end shields. Thus, the cube 4 is completely enclosed by concrete shields with a duct system operated by virtue of pressure provided by fan 20 to conduct air from close to ground level through the channels 9 into the stack 38 and thence into the atmosphere well above ground level at the top of the stack. In this connection it may be mentioned that, if desired, a portion of these ducts or channels may be filled with either uranium or thorium containing bodies or both.

It will be understood that a chain reaction takes place within the cube 4 by virtue of uranium-containing bodies disposed within the channels 6 the graphite blocks 2, 2 functioning as neutron moderator material to slow the neutrons to energy levels ranging between resonance and thermal energies at which values they are most effective to cause fission of the above mentioned uranium isotopes. The channels 6 which are thus loaded with uranium or similar fissionable bodies, roughly define a cylindrical active portion indicated at A (Fig. 2), and the channels 7 or 9 outwardly of this active portion are loaded with thorium-containing bodies for the production of $U^{233}$ as hereinafter described.

As more fully described in the above mentioned copending application, the neutron density within the cube 4 may be controlled by a control rod 40 diagrammatically illustrated in Fig. 2, said density being indicated by means of an ionization chamber 41 and a meter 43. The rod 40 extends into the graphite cube sliding in a channel therein and is operated from outside of the shield 30 by a rack and pinion mechanism 42. The rod 40 is constructed of an efficient neutron absorber such as cadmium or boron.

To accomplish loading of the uranium-containing bodies, as well as the thorium-containing bodies, into the various air channels 6, 6, the inlet end shield 24 is pierced with a plurality of apertures 44, 44 as best seen in Fig. 1, each aperture being aligned with the associated air channel 6. Normally, during operation of the reactor, the apertures 44, 44 are closed by removable lead plugs (not shown).

The uranium-containing bodies and the thorium-containing bodies are loaded into the channels 6 and 7, or 9, respectively, by a loading mechanism generally indicated at 46 and more fully described in the aforesaid copending application, said mechanism forming no part of the present invention. It may be noted that the mechanism 46 includes a rod or plunger 48 which may be reciprocated within a loading tube (not shown) insertable within the channels 6 and 7 for the purpose of inserting the charged material into these channels or for pushing the charged material from the discharge face 32 of the cube whereupon this material drops by gravity from the outlet face 32 into the outlet chamber 36. The discharged material which, as above noted, is in the form of uranium-containing and thorium-containing bodies, falls into an outlet pipe 50 comprising valve means 52 to control passage of the discharged material therethrough, the lower end of the pipe 50 opening into a coffin chamber 54 for the purpose of emptying the discharged material into a coffin car 56 which conveys said material from the reactor as more fully described in the aforementioned copending application. The uranium and thorium bodies may be separately collected.

It is known that the bombardment of thorium with fast neutrons or energies above about two million electron volts (2 mev.) results in fission of the thorium. By the process of the present invention the bombardment of thorium takes place with neutrons emanating from the reactor A which have energies of below about one million electron volts (1 mev.) (generally slow or thermal neutrons), resulting in the production of $Pa^{233}$ and ultimately of $U^{233}$ through beta decay of $Pa^{233}$.

The reaction of thorium with slow and moderately fast neutrons may be summarized as follows:

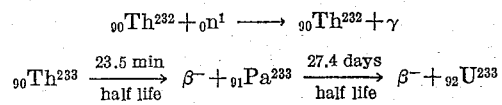

Where a $U^{233}$ atom thus formed absorbs a neutron and is fissioned thereby the fission products which are produced as a result of the fission of $U^{233}$ with slow and moderately fast neutrons are substantially the same as those produced by the fission of $U^{235}$. They consist of a large number of elements which generally fall into a light group with atomic numbers from 35 to 46, inclusive, and a heavy group with atomic numbers from 51 to 60, inclusive, and which undergo beta decay. The fission products which have a half life of more than three days will remain in the reaction mass in substantial quantities at least one month after the termination of the reaction, and the removal of these products by the process of the present invention is particularly advantageous. Among these products are: Sr, Y, Zr, Cb, Ru, Te, I, Xe, Cs, Ba, La, and Ce of a 20 day half life and Ce having a 200 day half life.

In accordance with this invention the mass of thorium in the form of a compound of thorium and a low atomic number element having a low neutron absorption cross section, such as the carbonate thereof, is dried or dehydrated by heating the compound at a temperature of at least approximately 200° C. until a constant weight is obtained. This may take as long as forty-eight hours, depending upon the drying conditions utilized. The compound is then compressed into a disc or pellet under a pressure of approximately 15 tons resulting in the procurement of a compound having a density of approximately 2.6 gms./cc. The pellet is then enclosed within a container or aluminum or other neutron pervious material of low capture cross section from which the atmosphere is exhausted or displaced by a gas having a low neutron capture cross-section such as helium and the container is then sealed. It will be understood that by means of the above process, loss of neutrons due to absorption by impurities possessing a relatively high capture cross-section is reduced to a minimum inasmuch as the drying process eliminates most of the $H_2O$ which contains such impurities. Furthermore, by compressing the compound to increase the density thereof, the rate of neutron absorption by the thorium is increased inasmuch as neutrons passing through the pellet encounter a relatively great number of thorium atoms because of the increased density of the compound.

The filled containers are then loaded into the cube 4 around the reactor A and are subjected, as hereinafter described, to the action of neutrons emanating therefrom, the majority of said neutrons being slowed to thermal or slow energies. Irradiation of the thorium is continued until the rate of absorption of neutrons by the $Pa^{233}$ and or $U^{233}$ thus formed becomes objectionably high. In general it may be said that such a condition prevails when the ratio of $U^{233}$ plus $Pa^{233}$ to unreacted $Th^{232}$ exceeds about one to one-hundred. In other words, the reaction of $Th^{232}$ with neutrons should preferably be terminated when, or slightly before the concentration of $U^{233}$ is approximately 1 percent of the amount of thorium present in the mass. As a result of terminating the reaction at or prior to the aforesaid $U^{233}$ concentration there is less danger during the irradiation period of a substantial decomposition of that isotope occurring by a neutron bombardment.

It is generally desirable to terminate the reaction of the neutrons with $Th^{232}$ when the amount of $U^{233}$ plus $Pa^{233}$ is much less than 1 percent of the unreacted amount of $Th^{232}$, however, in order to reduce the amount of fission products and thereby make it possible to isolate the $U^{233}$ by ordinary chemical means without the utilization of elaborate and expensive apparatus. Thus, it is usually preferable to terminate the reaction when the combined weights of $U^{233}$ and $Pa^{233}$ compared to the quantity of $Th^{232}$ present represent a ratio of not less than about one to one million and frequently between about one to ten thousand and one to one thousand.

The loading of the reactor may be varied to a substantial degree to secure the bombardment desired. The area designated as A in the drawings is loaded with a fissionable material in amount sufficient to establish the chain reaction. The remaining portion of the moderator block serves as a neutron reflector or moderator for neutrons escaping from section A.

If desired the thorium bodies may be disposed in section B and in this case escaping neutrons will be absorbed by the thorium therein. Moreover the moderator outside of section B serves as a reflector to reflect neutrons escaping from B.

It will be understood that many of the neutrons emanating from the reactor A are fast neutrons and it is thus necessary to rapidly slow these fast neutrons to slower energies. This slowing action is effected by the moderator outwardly of the reactor A, and may be facilitated, if desired, by providing an unloaded area B between the reactor A and the channels which are loaded with the thorium carbonate or similar pellets. In such a case the thorium bodies are loaded into the channels 9 outside of area B preferably leaving one or several unloaded rows in the exterior of the reactor to serve as an external reflector. Area B thus acts as a reflector to reflect escaping neutrons from the reactor A back into said reactor whereby the latter is effective to sustain a nuclear fission chain reaction even though the reactor is somewhat smaller than the critical size at which such a reaction would normally be sustained. The area B also slows most of the neutrons passing therethrough to energies below 1 mev. (largely to slow or thermal energies). It may be noted that especially effective results may be secured by bombardment of a thorium compound, such as thorium carbonate, wherein the thorium is combined with carbon which is capable of slowing neutrons without excessive absorption thereof. The neutron slowing properties of this type of compound permit exposure of the compound to a source of neutrons of relatively high energies. Accordingly this type of compound is particularly desirable when the thorium composition is placed in area B more or less immediately adjacent the active portion A.

Other neutronic reactors such as those described in the Fermi-Szilard application may be used. In each case the thorium carbonate, oxide, metal or other thorium component is disposed around the active portion of the neutron reactor and is bombarded by the neutrons leaking from such active portion.

The $U^{233}$ may be separated in useful and concentrated form from the neutron irradiated thorium mass by any method which will separate thorium from the reaction mass, and which preferably also will remove at least a portion of the fission products. Several practical methods are fully disclosed in co-pending application U.S. Serial No. 561,832, filed November 3, 1944 by Glenn T. Seaborg, et al., and now abandoned.

While the theory of nuclear reaction set forth herein is based on the best presently known experimental evidence, the invention is not limited thereto, as additional experimental data later discovered may modify the theory disclosed. Any such modification of theory, however, will in no way affect the results to be obtained in the practice of the invention herein described and claimed.

Obviously, many modifications may be made in the specific embodiments disclosed without departing from the intended scope of the invention.

What is claimed is:

1. A method of producing $U^{233}$ comprising heating a body of thorium carbonate to at least approximately 200° C. until said body attains a constant weight, compressing said body into a pellet having a density of at least 2.6 gms./cc. and enclosing the pellet in a sealed container, placing said pellet in a zone adjacent the active portion of a thermal nuclear reactor, operating said reactor to provide a flux of neutrons, the majority of which have an energy of below 1 mev., and terminating the reaction before the ratio of $U^{233}$ to $Th^{232}$ is about one to one hundred.

2. In combination with a neutronic reactor active portion comprising a mass of graphite having parallel passages therethrough and uranium disposed in said passages in an amount and concentration to sustain a neutronic chain reaction, a further mass of graphite surrounding said active portion, said further mass having passages therethrough parallel with the first passages, and thorium carbonate bodies of a density of 2.6 gms./cc., enclosed in containers of aluminum, in said passages in the surrounding graphite mass, whereby the net consumption of thermal neutron fissionable uranium isotopes in the neutronic reactor is reduced.

References Cited in the file of this patent
UNITED STATES PATENTS

| | | |
|---|---|---|
| 2,097,769 | Mitscherling | Nov. 2, 1937 |
| 2,206,634 | Fermi et al. | July 2, 1940 |
| 2,708,656 | Fermi et al. | May 17, 1955 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Dunning et al.: Phy. Rev. 48, pages 265–280 (1935).
Meitner et al.: Z. Physik 109, 538–52 (1938).
Kelly et al.: Phy. Rev. 73, 1135–9 (1948).